(12) United States Patent
Kazuya et al.

(10) Patent No.: US 6,744,385 B2
(45) Date of Patent: Jun. 1, 2004

(54) MAGNETIC MICRO-ENCODER AND MICRO MOTOR

(75) Inventors: Nakamura Kazuya, Adachi-ku (JP);
Sakurai Shinichi, Adachi-ku (JP);
Onodera Fumito, Adachi-ku (JP);
Odagiri Kinya, Adachi-ku (JP);
Shimizu Yukiharu, Adachi-ku (JP)

(73) Assignee: Namiki Seimitsu Houseki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/398,409
(22) PCT Filed: Aug. 6, 2002
(86) PCT No.: PCT/JP02/08018
§ 371 (c)(1), (2), (4) Date: Apr. 7, 2003
(87) PCT Pub. No.: WO03/016829
PCT Pub. Date: Feb. 27, 2003

(65) Prior Publication Data
US 2004/0032345 A1 Feb. 19, 2004

(30) Foreign Application Priority Data
Aug. 7, 2001 (JP) ......................................... 2001-238864

(51) Int. Cl.[7] .............................................. H03M 1/22
(52) U.S. Cl. .......................................................... 341/15
(58) Field of Search ................... 341/15, 14; 369/44.15, 369/219; 360/99.04; 310/67 R

(56) References Cited

U.S. PATENT DOCUMENTS 5,493,546 A * 2/1996 Kasahara ............... 369/44.15
5,721,723 A * 2/1998 Uchimaru et al. .......... 369/219
5,825,586 A * 10/1998 Teshima ................... 360/99.04
6,160,334 A * 12/2000 Teshima et al. .......... 310/67 R

FOREIGN PATENT DOCUMENTS

| JP | 6-221869 A | 8/1994 |
| JP | 7-218517 A | 8/1995 |
| JP | 2001-16815 A | 1/2001 |
| JP | 2001-33276 A | 2/2001 |

OTHER PUBLICATIONS

Microfilm of the Specification and Drawings Annexed to the Request of Japanese Utility Model Application No. 171682/1980 (Laid Open NP. 93810/1982) (Aichi Tokei Denki Kabushiki Kaisha) Jun. 9, 1982.

* cited by examiner

Primary Examiner—Jean Jeanglaude
(74) Attorney, Agent, or Firm—Nixon Peabody LLP; Donald R. Studebaker

(57) ABSTRACT

A magnetic micro-encoder 1 has a magnetic disk 4 polarized in an axial direction, a first back yoke 5 mounted on the magnetic disk 4, two magnetic sensors 6 arranged opposite to a surface of the magnetic disk 4 in an axial direction with a gap therebetween and being mounting on sensor mounting part of a flexible printed substrate 7 in such a manner that longitudinal direction of these magnetic sensors are substantially parallel to a band-formed wiring part of the flexible printed substrate 7, a second back yoke 8 mounted on a back of the magnetic sensors 6 with the flexible printed substrate 7 intervened therebetween and forming a magnetic circuit with the e first back yoke 5 and the magnetic disk 4, and a housing 3 for accmmodating the first back yoke 5, the magnetic disk 4, the magnetic sensors 6, and the second back yoke 8.

20 Claims, 12 Drawing Sheets

(a)

(b)

(a)

(b)

MAGNETIC MICRO-ENCODER AND MICRO MOTOR

TECHNICAL FIELD

The present invention relates to a magnetic encoder and a micromotor, and more particularly to a magnetic micro-encoder for detecting the number of rotations and a rotational direction of a motor, and a micromotor including the magnetic micro-encoder.

BACKGROUND ART

Conventionally, to detect the number of rotations and a rotational direction of a motor, an encoder has been used which includes a pair of sensors for obtaining both data of an A-phase and a B-phase. This encoder, shown in FIG. 7 for example, includes a rotatable magnetic disk and fixed side magnetic sensors, and it obtains rectangular waves from changes in output voltages of the magnetic sensors according to a rotation of the magnetic disk by putting these output voltages through a comparator. However, in a case of a microminiature encoder, for example, having an external diameter of 5 Φ mm or less, there are problems related to its housing space in an arrangement of electronic components such as magnetic sensors or the like for detecting both an A-phase and a B-phase. Namely, in an arrangement method in which magnetic sensors are arranged in a radial direction of a magnetic disk similarly to the conventional encoder, there is a limitation in reducing a diameter of the magnetic disk, and an arrangement space for the magnetic sensors is required to be in a radial direction of the magnetic disk, so that it is difficult to arrange the magnetic sensors and the magnetic disk in a housing space having a micro-sized diameter. On the other hand, in a case that two magnetic sensors in a rectangular shape are arranged opposite to a surface of a magnetic disk, an arrangement space for magnetic sensors is required to be in an axial direction of the magnetic disk, so that it is advantageous for reducing the diameter of the magnetic disk. In this case, as a method of arrangement for the two magnetic sensors, as shown in FIG. 8, an arrangement method is conceivable such that longitudinal directions of magnetic sensors 26a and 26b are arranged alongside of an inner periphery 23 of a housing. However, when this arrangement is tried inside the inner periphery 23 of a housing space with a micro-sized diameter, these two magnetic sensors 26a and 26b interfere with each other, so that this arrangement method is unacceptable. Further, in a method of arrangement for two magnetic sensors 36a and 36b in a rectangular shape as shown in FIG. 9, a part of housing is cut out so that it is possible to arrange the magnetic sensors 36a and 36b. However, since each of the magnetic sensors 36a and 36b has one pair of input terminals and one pair of output terminals on its diagonal lines, this arrangement complicates a wiring pattern connected to input terminals and output terminals, so that this arrangement method is unacceptable, too.

DISCLOSURE OF THE INVENTION

An object of the present invention is to provide a microminiature magnetic micro-encoder which includes a magnetic disk and two magnetic sensors being arranged in a housing with external diameter of 5 Φ mm or less and a micromotor including this magnetic micro-encoder.

The present inventors conducted dedicated studies of the number of poles of a magnetic disk, a magnetic disk, a positional relationship of magnetic sensors, and an arrangement of magnetic sensors and, as a result, achieved an optimum number of magnetic poles, an optimum positional relationship, and an optimum arrangement for microminiaturizing a magnetic encoder. Thus the present inventors accomplished the present invention.

The magnetic micro-encoder according to the present invention includes: a magnetic disk mounted on an rotation shaft and polarized in an axial direction; a first back yoke mounted on the magnetic disk; two magnetic sensors arranged opposite to a surface of the magnetic disk in an axial direction with a gap therebetween, which are also mounted on a sensor mounting part of a flexible printed substrate in such a manner that longitudinal directions of these magnetic sensors are substantially parallel to a band-formed wiring part of the flexible printed substrate; a second back yoke mounted on a back of the magnetic sensors with the flexible printed substrate intervened therebetween, which is forming a magnetic circuit with the first back yoke and the magnetic disk; and a housing for accommodating the first back yoke, the magnetic disk, the magnetic sensors, and the second back yoke.

The magnetic sensors detect changes of a magnetic flux density and a polarity on a rotating magnetic disk. These magnetic sensors are arranged opposite to a surface of the magnetic disk in an axial direction with a gap therebetween, which are also mounted on a sensor mounting part of a flexible printed substrate in such a manner that longitudinal directions of the magnetic sensors are substantially parallel to a band-formed wiring part of the flexible printed substrate. By adopting this structure, the magnetic sensors can be arranged in a microminiature housing. In addition, a flexible printed substrate is thinner than a generally used glass epoxy substrate, so that it is possible to make a sensor mounting substrate thinner. Accordingly, it is possible to make a length of the micro-encoder shorter.

In the magnetic micro-encoder according to the present invention, the number of magnetic poles of the magnetic disk is defined as 2 (1+4n) (where "n" is an integer of 0(zero) or more), and the two magnetic sensors are arranged in such a manner that their positions are open to each other in an angle of 90 degrees from the rotation shaft.

The number of magnetic poles of the magnetic disk is defined as 2 (1+4n) (where "n" is an integer of 0(zero) or more), and the magnetic sensors are arranged in such a manner that their positions are open in an angle of 90 degrees from the rotation shaft, in other words, their positions are separated from each other toward a radial direction of the rotation shaft in an angle of 90 degrees with the rotation shaft as the center. In accordance with the above arrangement, a phase difference of output waveforms of the two magnetic sensors, i.e., a phase difference of an A-phase and a B-phase becomes 90 degrees. When the phase difference of output waveforms becomes 90 degrees, allowable cycle variation widths of signal waveforms become maximum, so that detection accuracy in a rotational direction will be improved. In addition, the output waveforms can be easily quadrupled to improve a resolution.

In the magnetic micro-encoder according to the present invention, the number of magnetic poles of the magnetic disk is defined as 2 (3+4n) (where "n" is an integer of 0(zero) or more), and the two magnetic sensors are arranged in such a manner that their positions are open to each other in an angle of 90 degrees from the rotation shaft.

The number of magnetic poles of a magnetic disk is defined as 2 (3+4n) (where "n" is an integer of 0(zero) or more), and magnetic sensors are arranged in such a manner that their positions are open in an angle of 90 degrees from the rotation shaft, in other words, their positions are separated from each other toward a radial direction of the rotation shaft in an angle of 90 degrees with the rotation shaft as the center. In accordance with the above arrangement, a phase difference of output waveforms of the two magnetic sensors, i.e., a phase difference of an A-phase and a B-phase becomes 90 degrees. When the phase difference of output waveforms becomes 90 degrees, allowable cycle variation widths of signal waveforms become maximum, so that detection accuracy in a rotational direction will be improved. In addition, the output waveforms can be easily quadrupled to improve a resolution.

The magnetic micro-encoder according to the present invention has a structure in which a cut-out portion is formed on the housing for drawing out the band-formed wiring part therethrough, the sensor mounting part is formed along a shape of the cut-out portion, and the flexible printed substrate is engaged with the housing to be fixed therein.

The flexible printed substrate is fixed in the housing in such a manner that a side surface of the sensor mounting part abuts on an inner periphery surface of the housing and on the cut-out portion of the housing. As described above, the magnetic micro-encoder of the present invention has a structure in which the flexible printed substrate is engaged with the housing to be fixed therein. The sensor mounting part of the flexible printed substrate is formed along the cut-out portion of the housing and the inner periphery surface of the housing, so as to prevent a positional displacement of the flexible printed substrate in a rotational direction of the rotation shaft. Therefore, a fixing strength of the flexible printed substrate can be improved.

The magnetic micro-encoder according to the present invention has a fixing structure in which a stepped portion is formed on an inner surface of the housing, the second back yoke is engaged with the housing with the flexible printed substrate intervened therebetween, and the flexible printed substrate is sandwiched between the stepped portion and the second back yoke to be fixedly arranged therebetween in a mechanical manner.

The second back yoke is formed along the cut-out portion of the housing and along the inner periphery surface of the housing and is press fitted into or inserted and adhered into the housing, in such a manner that a side surface of the second back yoke abuts on the inner periphery surface and the cut-out portion of the housing. By sandwiching the flexible printed substrate between the stepped portion formed on the inner surface of the housing and the second back yoke, the fixing strength of the flexible printed substrate in an axial direction of the housing can be improved.

In the magnetic micro-encoder according to the present invention, the second back yoke doubles as an end cap to cover an opening of the housing.

The opening of the housing is on the opposite side of the magnetic sensors. Since the second back yoke doubles as the end cap, the number of components can be reduced, and a length of the magnetic micro-encoder can be shortened. Namely, the second back yoke combines the role of the magnetic circuit formation, the flexible substrate fixation, and the end cap.

In the magnetic micro-encoder according to the present invention, the housing is formed in a substantially cylindrical shape, and this housing is formed in an external diameter of 5 Φ mm or less.

In the magnetic micro-encoder, the housing is formed in an external diameter of 5 Φ mm or less, more preferably, the housing is formed in an external diameter ranging from 2 Φ mm to 4 Φ mm. In addition, the magnetic micro-encoder of the present invention has a structure in which an external diameter of the encoder can be reduced according to the miniaturization of the magnetic sensors.

The micromotor according to the present invention has the magnetic micro-encoder provided therein.

The micromotor according to the present invention has a speed reducer provided therein.

The speed reducer is placed on an output shaft of the micromotor and reduces the speed by predetermined speed reduction ratio. The speed reducer is constructed with, for example, a plurality of planetary gears. The placement of this speed reducer increases the number of output waveforms (pulses) of the encoder according to a movement of the motor output shaft (output shaft of the speed reducer) and improves the resolution, so that the micromotor can be controlled more precisely.

BEST MODE FOR CARRYING OUT THE INVENTION

Figure 1:
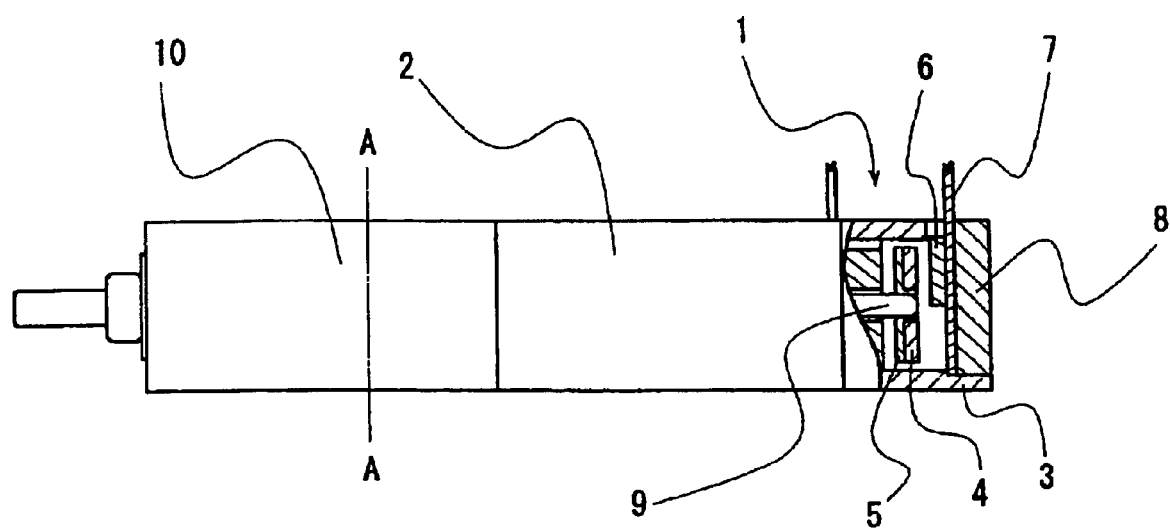
FIG. 1 is an explanatory view showing an overview of a magnetic micro-encoder according to an embodiment of the present invention.

A magnetic micro-encoder according to the present invention is placed on one end of a micromotor 2 as shown in FIG. 1. The magnetic micro-encoder includes a housing 3 in a substantially cylindrical shape that accommodates a magnetic disk 4, a first back yoke 5, two hall elements (magnetic sensors) 6, a flexible printed substrate 7, and a second back yoke 8. The magnetic micro-encoder detects changes of a magnetic flux density and a polarity due to a rotation of the magnetic disk 4 to thereby output an A-phase and a B-phase.

Figure 2:
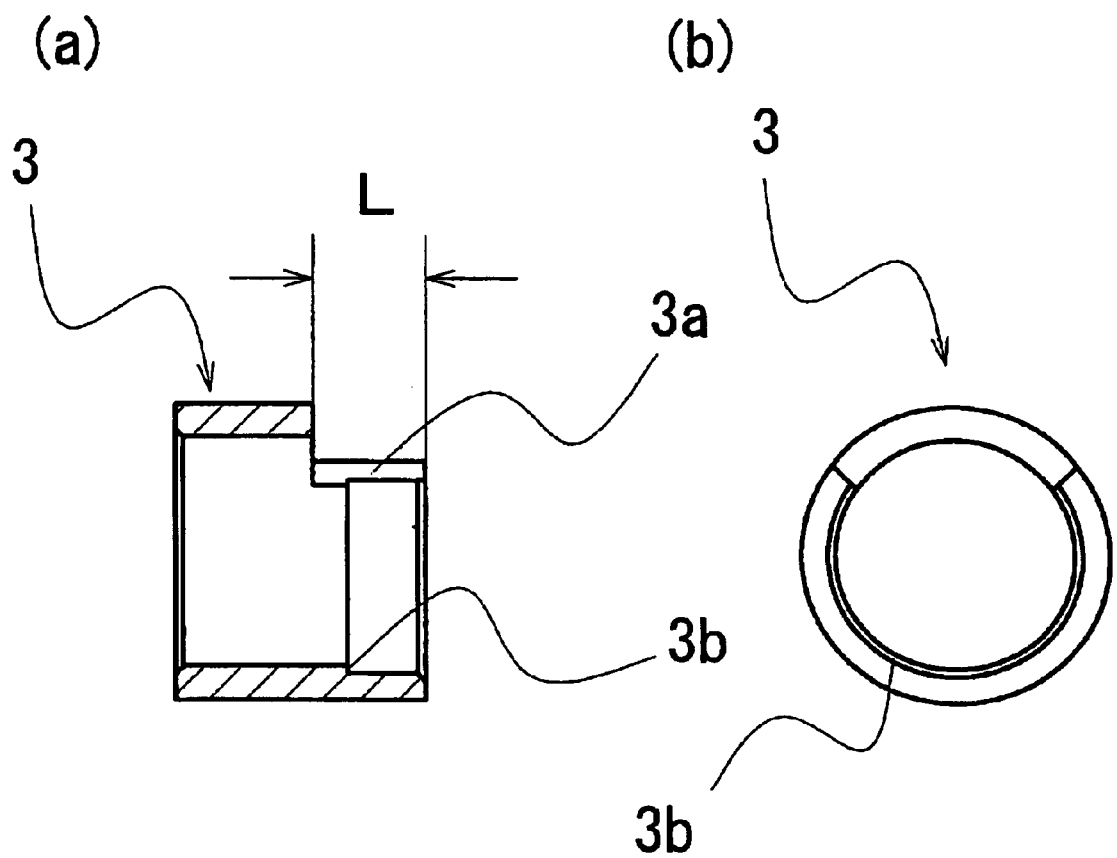
FIG. 2(a) and FIG. 2(b) are explanatory views showing a housing of the magnetic micro-encoder according to the embodiment of the present invention.

The housing 3, as shown in FIG. 2(a) and FIG. 2(b), is formed in a substantially cylindrical shape with an external diameter of approximately 4 Φ mm, which is the same external diameter as the micromotor 2. A cut-out portion 3a is formed on the housing 3 for drawing out the flexible printed substrate 7 therethrough. As shown in FIG. 2(a), a length L of the cut-out portion 3a is formed to be equivalent to a total thickness of the flexible printed substrate 7, the hall elements 6, and the second back yoke 8. In addition, a stepped portion 3b in a substantially circular shape for positioning and fixing the flexible printed substrate 7 is formed on an inner surface of the housing 3.

Figure 3:
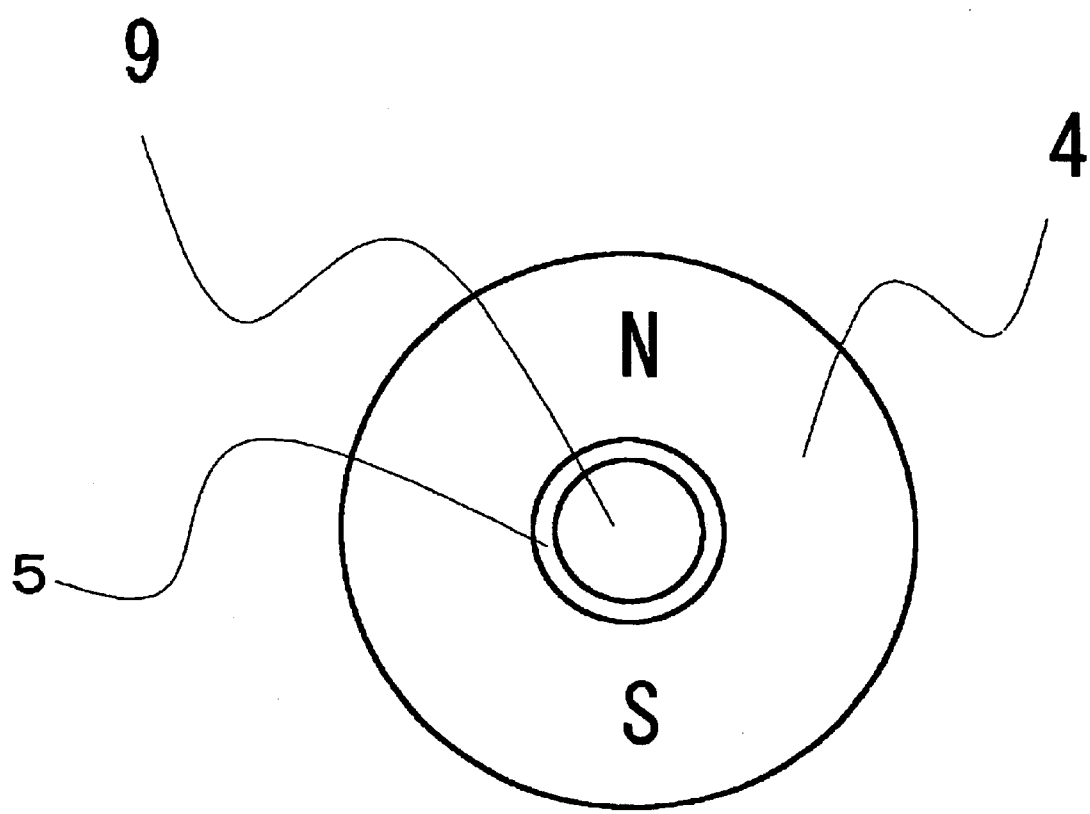
FIG. 3 is an explanatory view showing a magnetic disk of the magnetic micro-encoder according to the embodiment of the present invention.

The magnetic disk 4 is formed in a platter shape, is fixed on a rotation shaft 9 of the micromotor 2 through the first back yoke 5, and rotates with a rotation of the rotation shaft 9. As shown in FIG. 3, this magnetic disk 4 is polarized with two magnetic poles in an axial direction of the rotation shaft 9. The first back yoke 5 is formed in the same diameter as the magnetic disk 4 and fixed to the rotation shaft 9 so as to face the magnetic disk 4. The first back yoke 5 rotates with a rotation of the rotation shaft 9 as one united body with the magnetic disk 4.

Figure 4:
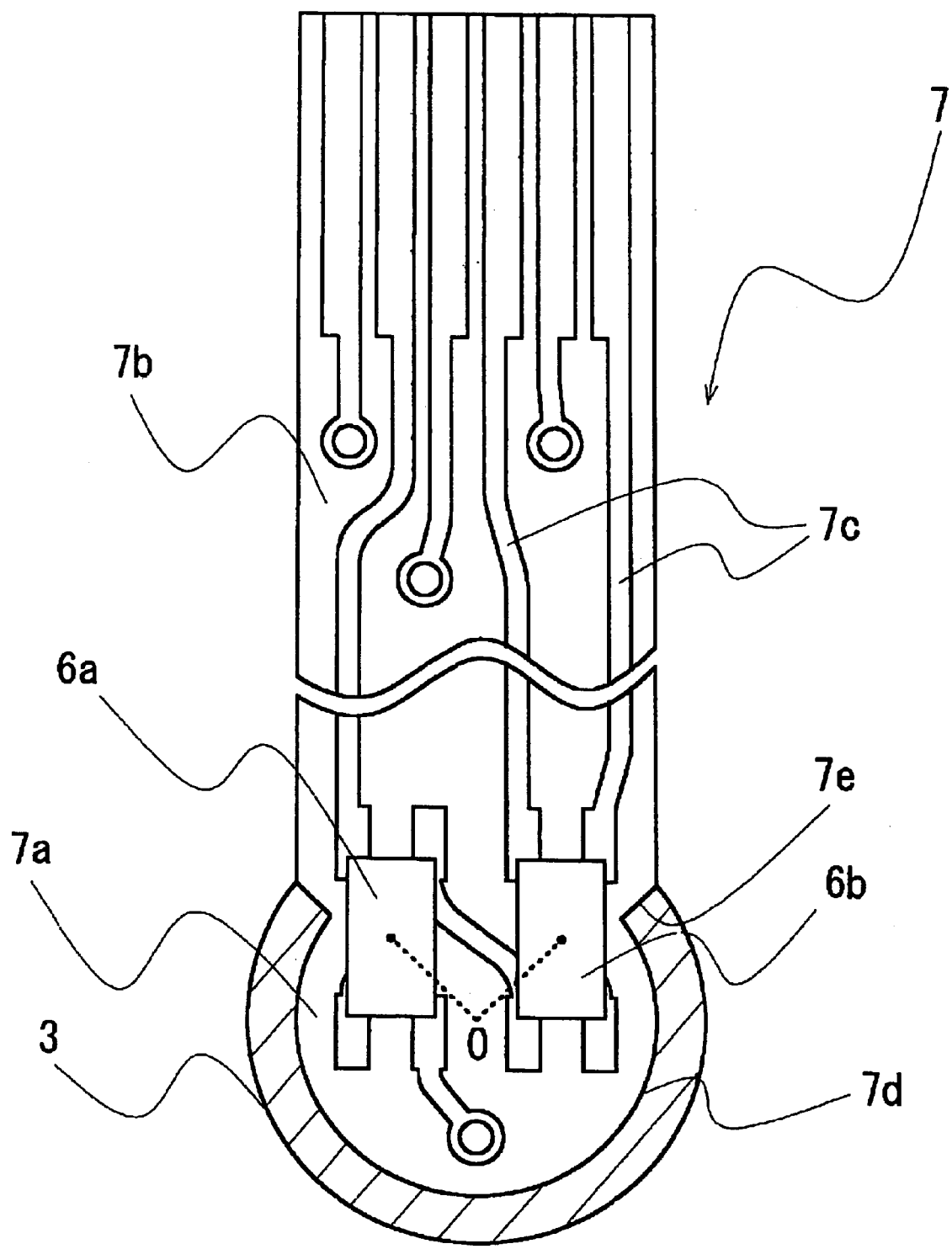
FIG. 4 is an explanatory view showing a flexible printed substrate of the magnetic micro-encoder according to the embodiment of the present invention.

The flexible printed substrate 7, as shown in FIG. 4, has a sensor mounting part 7a and a band-formed wiring part 7b and is connected to a not-shown power supply and a not-shown comparator. A wiring pattern 7c connected to input/output terminals of the magnetic sensors 6a and 6b is formed on the band-formed wiring part 7b. The sensor mounting part 7a is structured to have a substantially platter shape part 7d formed along an inner periphery surface of the housing 3, and an hour-glass shape part 7e formed along an opening shape of the cut-out portion 3a. The two hall elements 6a and 6b are mounted on this sensor mounting part 7a.

The two hall elements 6a and 6b are formed in a rectangular shape and detect changes of a magnetic flux density and a polarity in the proximity of their center positions. These two hall elements 6a and 6b are arranged in a manner that their longitudinal directions are substantially parallel to the band-formed wiring part 7b of the flexible printed substrate 7, and their positions are open to each other in an angle of 90 degrees from the rotation shaft 9. Further, four corners of these hall elements are the input/output terminals which are connected to the wiring pattern 7c. By arranging these two hall elements to the positions open to each other in an angle of 90 degrees, in relation to the magnetic disk polarized with poles of 2 (1+4n) (where "n" is an integer of 0(zero) or more), a phase difference between output waveforms of the two hall elements 6a and 6b becomes 90 degrees.

Figure 10:
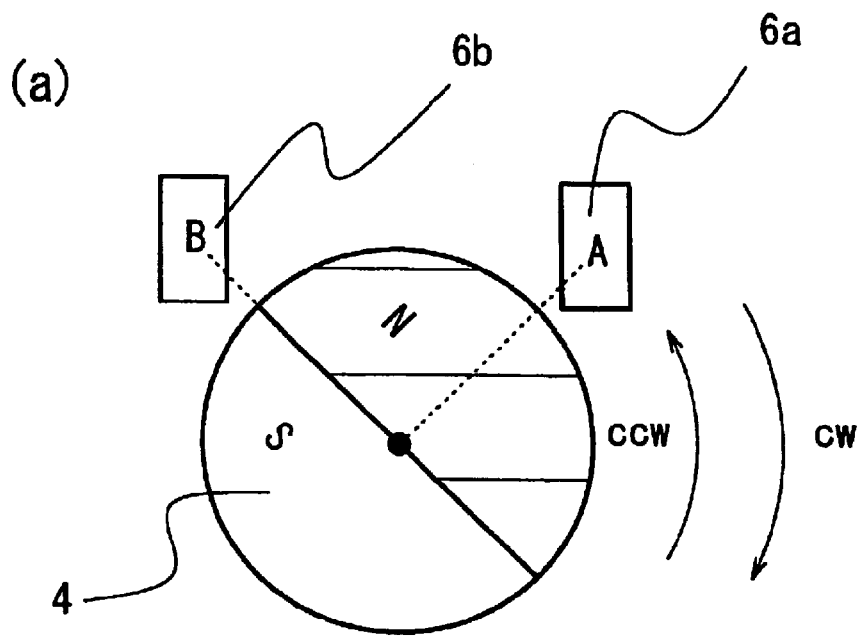
FIG. 10(a) and FIG. 10(b) are explanatory views showing positional relationships between the magnetic disk and hall elements and a rotational direction of the magnetic disk.
Figure 10:
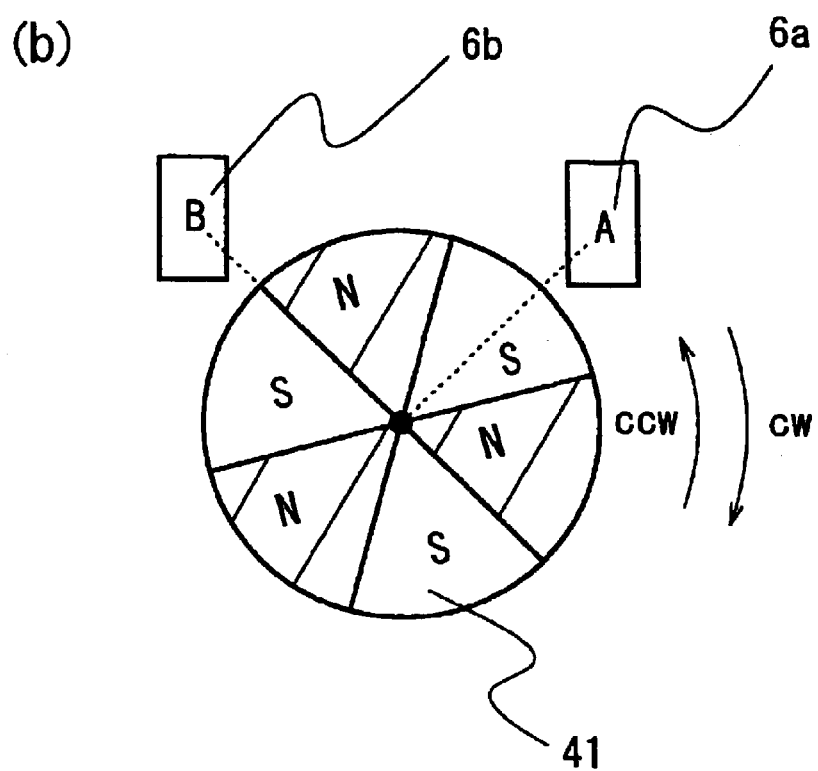
Figure 11:
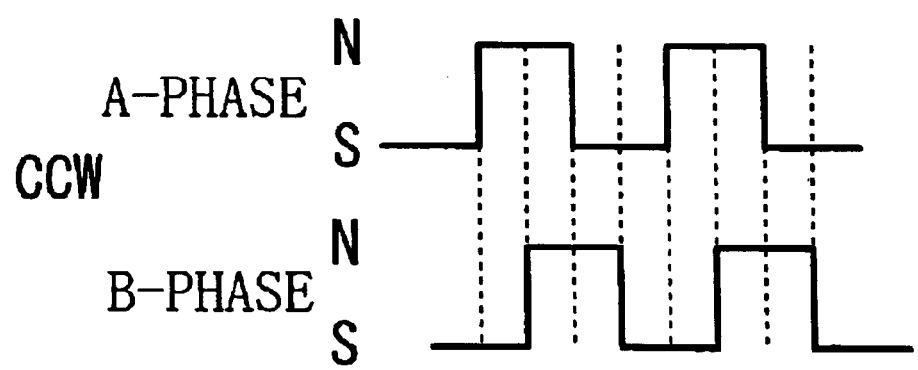
FIG. 11(a) and FIG. 11(b) are explanatory views showing relationships between the magnetic disk polarized with poles of 2 (1+4n) (where "n" is an integer of 0(zero) or more) and phase differences of waveforms of the hall elements.
Figure 11:
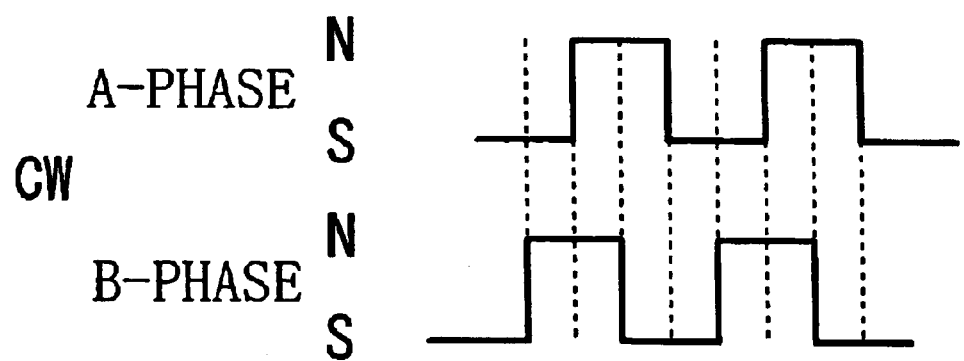

As shown in FIG. 10(a), when a rotational direction of the magnetic disk 4 is counterclockwise (CCW), a relationship between the output waveforms of the hall elements 6a and 6b is that the B-phase delays 90 degrees to the A-phase as shown in FIG. 11(a). On the other hand, when the rotational direction of the magnetic disk 4 is clockwise (CW), a relationship between the output waveforms of the hall elements 6a and 6b is that the B-phase advances 90 degrees to the A-phase as shown in FIG. 11(b). Consequently, allowable cycle variation widths of the output waveforms become maximum, so that detection accuracy in the rotational direction will be improved. In addition, the output waveforms can be easily quadrupled to improve a resolution.

The second back yoke 8 is structured to have a small diameter portion 8a in substantially platter shape formed along an inner periphery surface of the housing 3 to cover the opening 3c of the housing 3, and a large diameter portion 8b in fan shape having the same diameter as the external diameter of the housing 3. The second back yoke 8 forms a magnetic circuit with the first back yoke 5 and the magnetic disk 4 and doubles as an end cap to cover the opening 3c of the housing 3.

Figure 5:
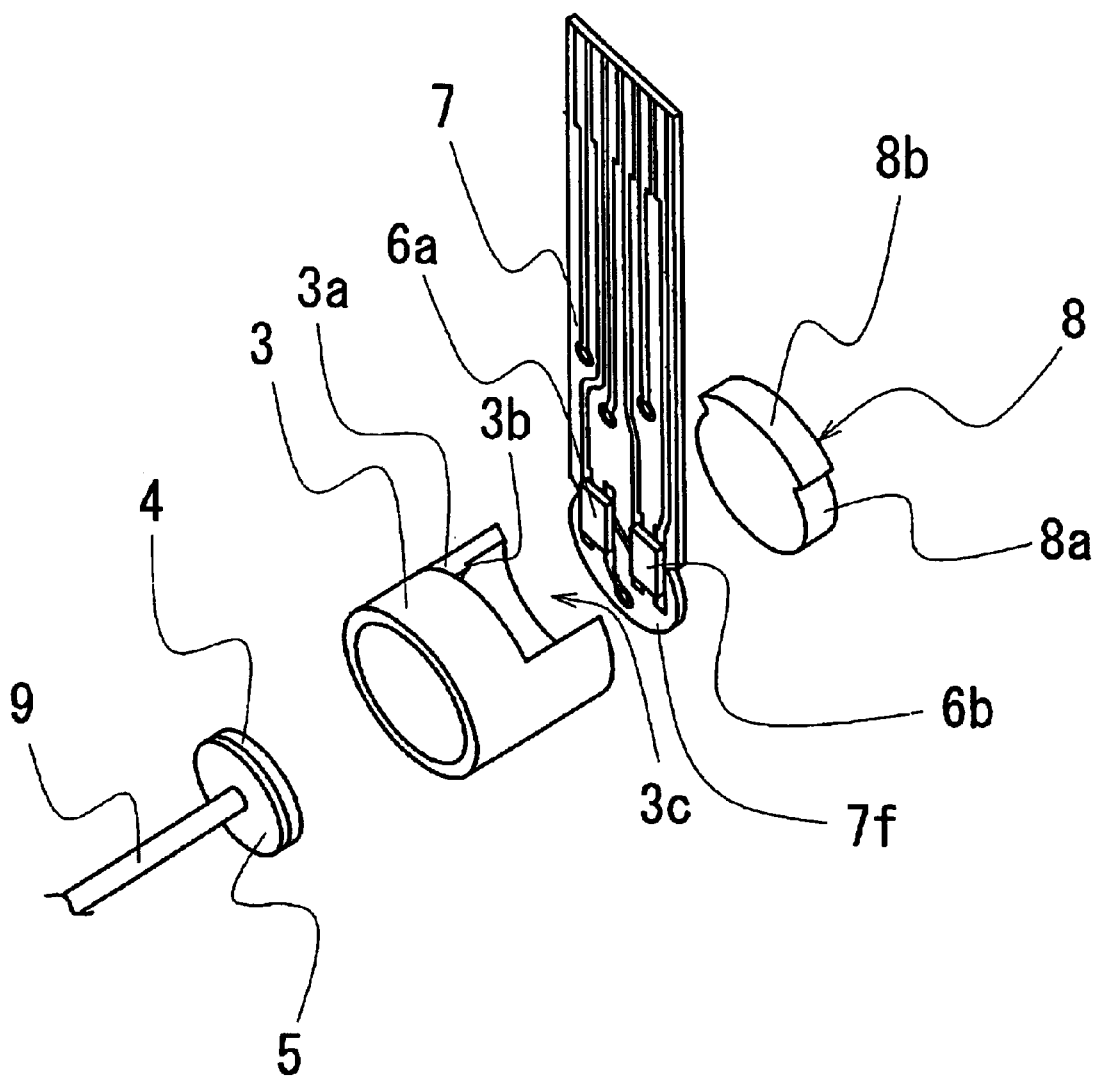
FIG. 5 is an explanatory view showing the magnetic micro-encoder according to the embodiment of the present invention.

Next, a relationship between a structure for fixing the flexible printed substrate 7 to the housing 3 and the second back yoke 8 is further explained with reference to FIG. 4 and FIG. 5.

The flexible printed substrate 7 is inserted into the housing 3 until a surface 7f of the sensor mounting part 7a abuts on the stepped portion 3b. Then, the second back yoke 8 is press fitted into the housing 3 until it abuts on a back surface of the flexible printed substrate 7 to sandwich and fix the flexible printed substrate 7 between the stepped portion 3b of the housing 3 and the second back yoke 8. In this manner, the flexible printed substrate 7 is inserted into the housing 3, and thereafter, the second back yoke 8 is press fitted into and engaged with the housing 3, so that the fixing strength of the flexible printed substrate 7 to the housing 3 in an axial direction is improved. Further, the hour-glass shape part 7e of the flexible printed substrate 7 fits into a shape of the cut-out portion 3a of the housing 3, and a positioning part of the flexible printed substrate 7 abuts on a positioning part of the housing 3. Accordingly, a positional displacement of the flexible printed substrate 7 in a radial direction of the housing 3 is prevented, and the fixing strength of the flexible printed substrate 7 is improved.

By fixing the flexible printed substrate 7 according to the above-mentioned fixing structure, the two hall elements 6a and 6b are arranged opposite to a surface of the magnetic disk 4 in an axial direction with a gap therebetween, as shown in FIG. 1, to thereby detect changes of a magnetic flux density and a polarity on the rotating magnetic disk 4.

Figure 6:
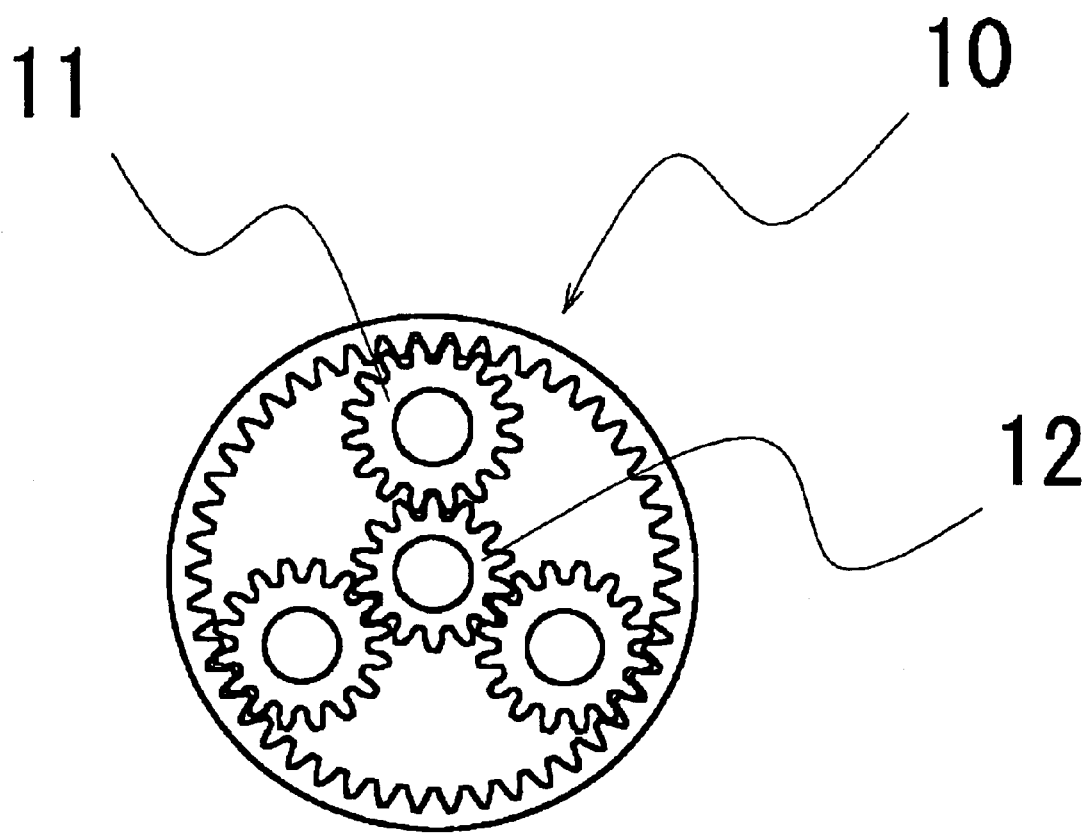
FIG. 6 is an explanatory view showing a speed reducer according to the embodiment of the present invention.
Figure 7:
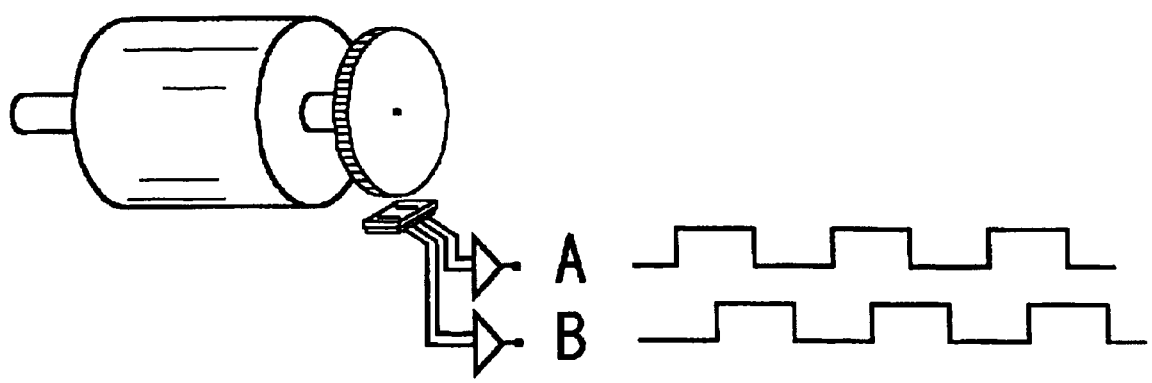
FIG. 7 is an explanatory view showing a conventional magnetic encoder.
Figure 8:
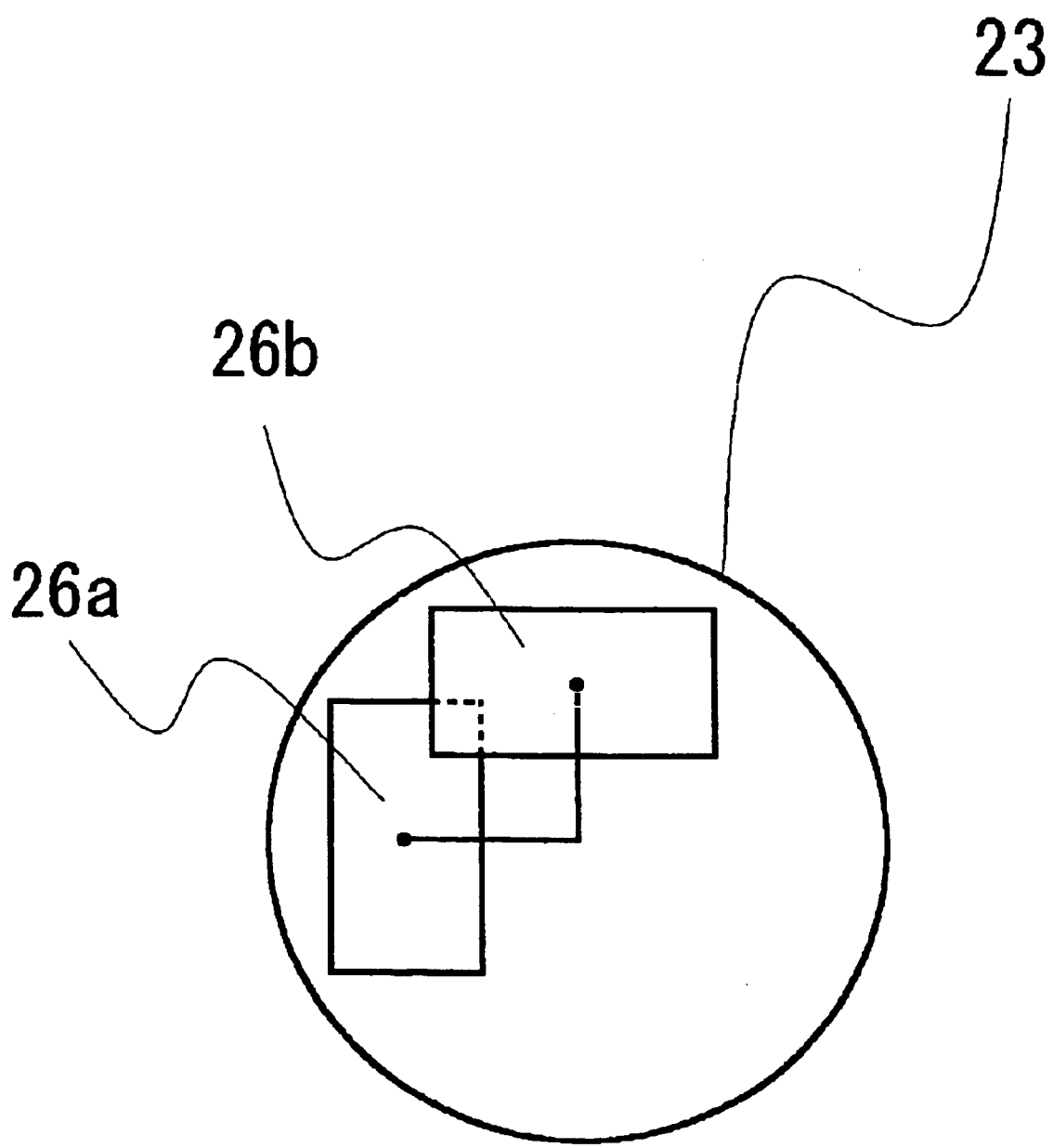
FIG. 8 is an explanatory view showing a method of arrangement for the magnetic encoder.
Figure 9:
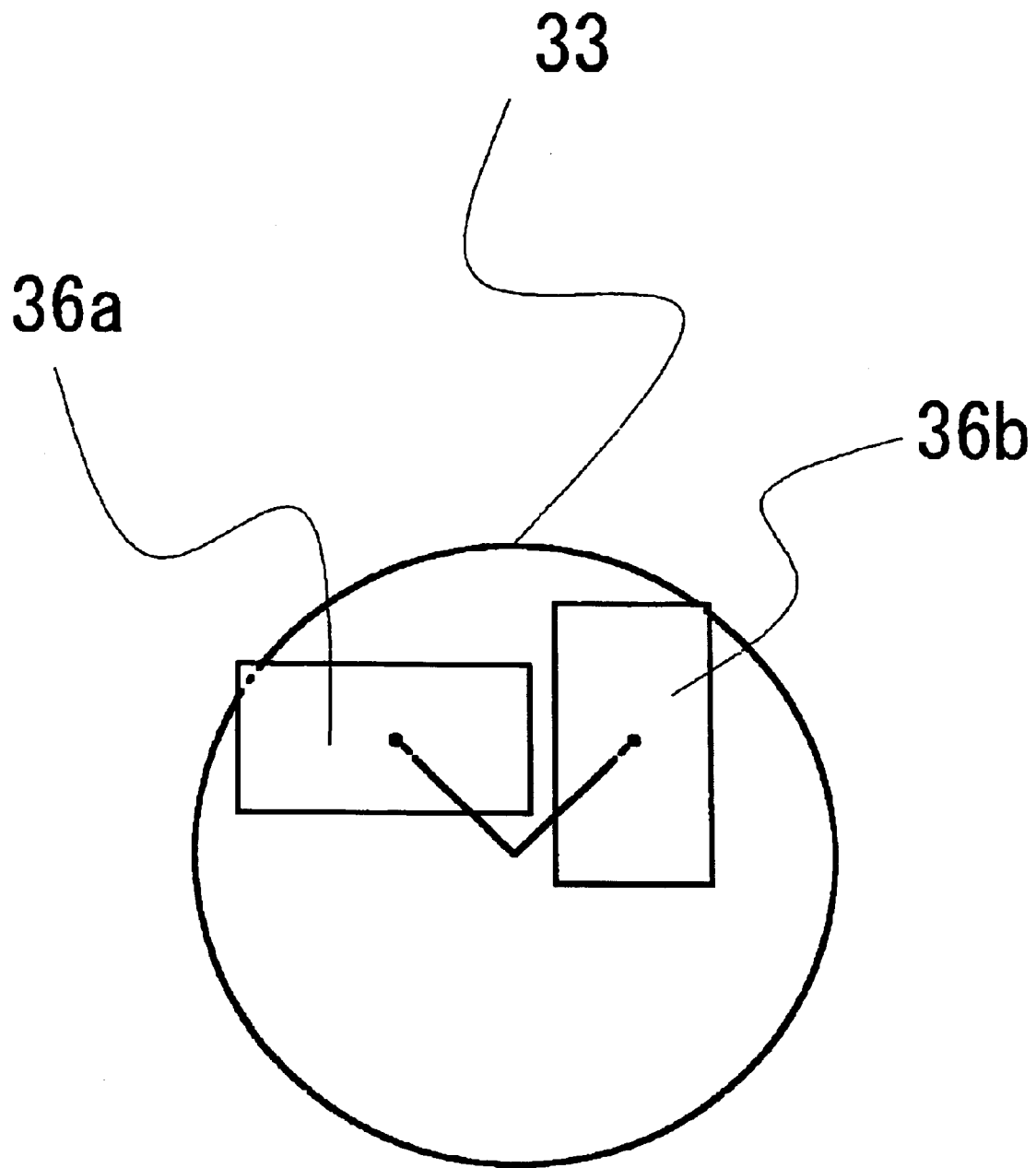
FIG. 9 is an explanatory view showing a method of arrangement for the magnetic encoder.

A speed reducer 10 is placed on an output side of the micromotor 2 having the magnetic micro-encoder 1. FIG. 6 is showing an A to A cross-sectional view of the speed reducer 10 that is shown in FIG. 1. The speed reducer 10 is a planetary-gear-type speed reduction mechanism such that, in a case of a single stage construction for example, three planetary gears 11 engage with a pinion 12, which is fixed on a motor output shaft, to reduce speed and increase torque.

In a case that a three-phase sensorless brushless motor is used as the micromotor 2, and the speed reducer 10 with gear ratio of 79:1 is placed to this micromotor, a relationship between a motor output shaft (output shaft of the speed reducer) and an output signal (pulse) per one phase of the magnetic sensor is described below.

If the speed reducer is not placed, the micromotor according to the present invention outputs one pulse per one phase of the magnetic disk since it has two magnetic poles. On the other hand, when the speed reducer with gear ratio of 79:1 is placed to the micromotor, its motor output shaft (output shaft of the speed reducer) outputs 79 pulses per one rotation. In this manner, the number of output signals (pulse) per one phase of the magnetic sensor produced by one rotation of the motor output shaft is increased, so that a resolution of the magnetic micro-encoder 1 is improved corresponding to a speed reduction ratio.

Figure 12:
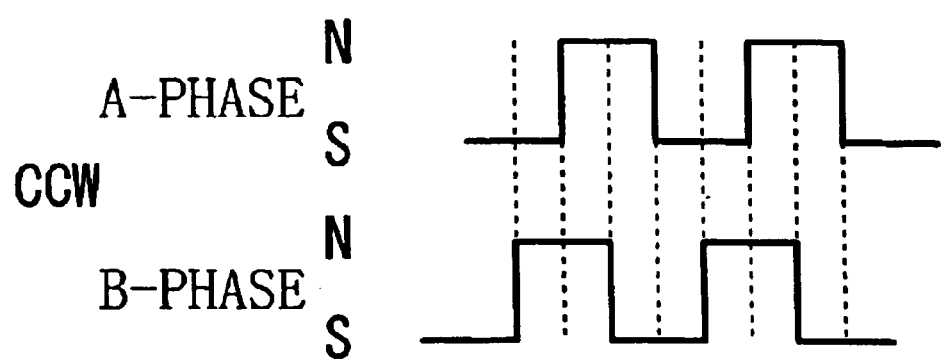
FIG. 12(a) and FIG. 12(b) are explanatory views showing relationships between the magnetic disk polarized with poles of 2 (3+4n) (where "an" is an integer of 0(zero) or more) and phase differences of waveforms of the hall elements.
Figure 12:
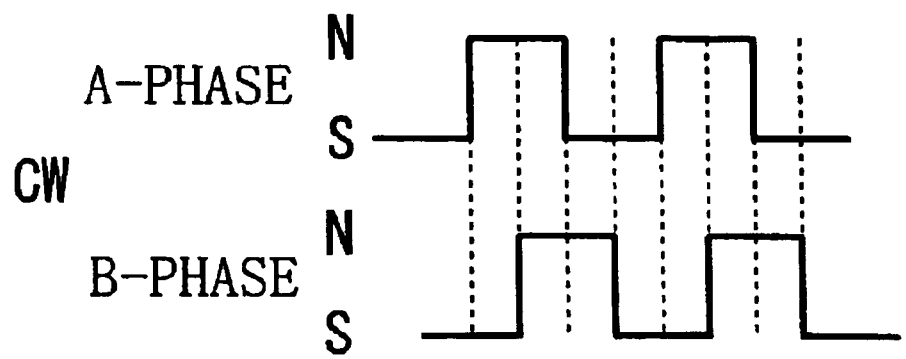

In this embodiment, the magnetic disk 4 which is polarized with poles of 2 (1+4n) (where "n" is 0(zero) in this embodiment) has been explained. However, in relation to a magnetic disk 41 polarized with six magnetic poles, when the two hall elements are arranged to the positions open to each other in an angle of 90 degrees, a phase difference between output waveforms of the two hall elements 6a and 6b still becomes 90 degrees. As shown in FIG. 10(b), when a rotational direction of the magnetic disk 41 is counterclockwise (CCW), a relationship between the output waveforms of the hall elements 6a and 6b is that the B-phase advances 90 degrees to the A-phase as shown in FIG. 12(a). On the other hand, when the rotational direction of the magnetic disk 41 is clockwise (CW), a relationship between the output waveforms of the hall elements 6a and 6b is that the B-phase delays 90 degrees to the A-phase as shown in FIG. 12(b). Consequently, allowable cycle variation widths of the output waveforms become maximum, so that detection accuracy in the rotational direction will be improved. In addition, the output waveforms can be easily quadrupled to improve a resolution.

In this embodiment, the magnetic micro-encoder 1 having the housing 3 with an external diameter of 4 Φ mm has been explained. However, the external diameter of the housing 3 is not limited to this diameter. Similarly, for the shapes of the housing 3, the flexible printed substrate 7 and the second back yoke 8, the above described shapes are explained just as examples and not as restrictions.

When the two hall elements are arranged to the positions open to each other in an angle of 90 degrees, the number of poles of the magnetic disk 4 should be 2 (1+4n) (where "n" is an integer of 0(zero) or more) or 2 (3+4n) (where "n" is an integer of 0(zero) or more), so that the magnetic disk 4 is not limited to two magnetic poles or six magnetic poles. Accordingly, for example, when "n" is 1, the number of magnetic poles is 10 or 14, when "n" is 2, the number of magnetic poles is 18 or 22, and when "n" is 3, the number of magnetic poles is 26 or 30.

As has been described, the hall elements 6 are used as magnetic sensors in this embodiment. However, the magnetic sensors are not limited to the hall elements 6, and hall ICs can be used as the magnetic sensors. Further, the hall elements 6a and 6b are not limited to a rectangular shape, so that hall elements in a substantially rectangular shape, a square shape, or a substantially square shape can be used. Furthermore, the planetary-gear-type speed reduction mechanism is adopted for the speed reducer 10. However, the speed reducer 10 is not limited to this mechanism. As long as a structural space permits, a speed reduction mechanism with regular spur gears, a speed reduction mechanism with worms and worm wheels or the like can be used as long as a structural space permits.

INDUSTRIAL AVAILABILITY

The present invention provides an advantage that a microminiature magnetic micro-encoder can be constructed with a magnetic disk and two magnetic sensors arranged in a housing having an external diameter of 5 Φ mm or less. The present invention also provides an advantage that an external diameter of the housing can be further reduced according to the miniaturization of the two magnetic sensors.

The present invention provides an advantage that a phase difference of output waveforms becomes 90 degrees, which makes allowable cycle variation widths of signal waveforms to be maximum, thereby improving detection accuracy in a rotational direction. The present invention also provides an advantage that the output waveforms can be easily quadrupled to improve a resolution.

The present invention provides an advantage that a fixing strength of the flexible printed substrate can be improved by preventing a positional displacement of the flexible printed substrate in a radial direction.

The present invention provides an advantage that a fixing strength of the flexible printed substrate to the housing in an axial direction is improved by sandwiching the flexible printed substrate between a stepped portion formed on an inner surface of the housing and a second back yoke.

The present invention provides an advantage that the second back yoke doubles as an end cap, so that the number of components can be reduced, and a length of the magnetic micro-encoder can be shortened.

The present invention provides an advantage that a microminiature magnetic micro-encoder can be constructed with a magnetic disk and two magnetic sensors arranged in a housing having an external diameter of 5 Φ mm or less in a substantially cylindrical shape.

The present invention provides an advantage that a microminiature actuator can be obtained.

The present invention provides an advantage that a resolution of the magnetic micro-encoder can be improved according to a speed reduction ratio of a speed reducer. The present invention also provides an advantage that it is suitable for use in a medical instrument such as an endoscope or in a micromachine.

It is claimed:

1. A magnetic micro-encoder, comprising:
   a magnetic disk mounted on a rotation shaft and polarized in an axial direction;
   a first back yoke mounted on said magnetic disk;
   two magnetic sensors arranged opposite to a surface of said magnetic disk in an axial direction with a gap therebetween, said magnetic sensors being mounted on a sensor mounting part of a flexible printed substrate in such a manner that longitudinal directions of said magnetic sensors are substantially parallel to a band-formed wiring part of the flexible printed substrate;
   a second back yoke mounted on a back of said magnetic sensors with the flexible printed substrate intervened therebetween, said second back yoke forming a magnetic circuit with said first back yoke and said magnetic disk; and
   a housing for accommodating said first back yoke, said magnetic sensors, and said second back yoke.

2. A magnetic micro-encoder, comprising:
   a magnetic disk mounted on a rotation shaft and polarized in an axial direction;
   a first back yoke mounted on said magnetic disk;
   two magnetic sensors arranged opposite to a surface of said magnetic disk in an axial direction with a gap therebetween, said magnetic sensors being mounted on a sensor mounting part of a flexible printed substrate in such a manner that longitudinal directions of said magnetic sensors are substantially parallel to a band-formed wiring part of the flexible printed substrate;
   a second back yoke mounted on a back of said magnetic sensors with the flexible printed substrate intervened therebetween, said second back yoke forming a magnetic circuit with said first back yoke and said magnetic disk; and
   a housing for accommodating said first back yoke, said magnetic sensors, and said second back yoke,
   wherein a number of magnetic poles of said magnetic disk is defined as 2 (1+4n) (where "n" is an integer of 0(zero) or more), and said two magnetic sensors are arranged in such a manner that their positions are open to each other in an angle of 90 degrees from the rotation shaft.

3. A magnetic micro-encoder, comprising:

a magnetic disk mounted on a rotation shaft and polarized in an axial direction;

a first back yoke mounted on said magnetic disk;

two magnetic sensors arranged opposite to a surface of said magnetic disk in an axial direction with a gap therebetween, said magnetic sensors being mounted on a sensor mounting part of a flexible printed substrate in such a manner that longitudinal directions of said magnetic sensors are substantially parallel to a band-formed wiring part of the flexible printed substrate;

a second back yoke mounted on a back of said magnetic sensors with the flexible printed substrate intervened therebetween, said second back yoke forming a magnetic circuit with said first back yoke and said magnetic disk; and a housing for accommodating said first back yoke, said magnetic sensors, and said second back yoke, wherein a number of magnetic poles of said magnetic disk is defined as 2 (3+4n) (where "n" is an integer of 0(zero) or more), said two magnetic sensors are arranged in such a manner that their positions are open to each other in an angle of 90 degrees from the rotation shaft.

4. A magnetic micro-encoder, comprising:

a magnetic disk mounted on a rotation shaft and polarized in an axial direction;

a first back yoke mounted on said magnetic disk;

two magnetic sensors arranged opposite to a surface of said magnetic disk in an axial direction with a gap therebetween, said magnetic sensors being mounted on a sensor mounting part of a flexible printed substrate in such a manner that longitudinal directions of said magnetic sensors are substantially parallel to a band-formed wiring part of the flexible printed substrate;

a second back yoke mounted on a back of:said magnetic sensors with the flexible printed substrate intervened therebetween, said second back yoke forming a magnetic circuit with said first back yoke and said magnetic disk; and a housing for accommodating said first back yoke, said magnetic sensors, and said second back yoke, wherein said housing is structured in such a manner that a cut-out portion is formed on said housing for drawing out the band-formed wiring part therethrough, the sensor mounting part is formed along a shape of the cut-out portion, and the flexible printed substrate is engaged with said housing to be fixed therein.

5. A magnetic micro-encoder, comprising:

a magnetic disk mounted on a rotation shaft and polarized in an axial direction;

a first back yoke mounted on said magnetic disk;

two magnetic sensors arranged opposite to a surface of said magnetic disk in an axial direction with a gap therebetween, said magnetic sensors being mounted on a sensor mounting part of a flexible printed substrate in such a manner that longitudinal directions of said magnetic sensors are substantially parallel to a band-formed wiring part of the flexible printed substrate;

a second back yoke mounted on a back of said magnetic sensors with the flexible printed substrate intervened therebetween, said second back yoke forming a magnetic circuit with said first back yoke and said magnetic disk; and a housing for accommodating said first back yoke, said magnetic sensors, and said second back yoke, wherein a number of magnetic poles of said magnetic disk is defined as 2 (1+4n) (where "n" is an integer of 0(zero) or more), said two magnetic sensors are arranged in such a manner that their positions are open to each other in an angle of 90 degrees from the rotation shaft, and said housing is structured in such a manner that a cut-out portion is formed on said housing for drawing out the band-formed wiring part therethrough, the sensor mounting part is formed along a shape of the cut-out portion, and the flexible printed substrate is engaged with said housing to be fixed therein.

6. A magnetic micro-encoder, comprising:

a magnetic disk mounted on a rotation shaft and polarized in an axial direction;

a first back yoke mounted on said magnetic disk;

two magnetic sensors arranged opposite to a surface of said magnetic disk in an axial direction with a gap therebetween, said magnetic sensors being mounted on a sensor mounting part of a flexible printed substrate in such a manner that longitudinal directions of said magnetic sensors are substantially parallel to a band-formed wiring part of the flexible printed substrate;

a second back yoke mounted on a back of said magnetic sensors with the flexible printed substrate intervened therebetween, said second back yoke forming a magnetic circuit with said first back yoke and said magnetic disk; and a housing for accommodating said first back yoke, said magnetic sensors, and said second back yoke, wherein a number of magnetic poles of said magnetic disk is defined as 2 (3+4n) (where "n" is an integer of 0(zero) or more), said two magnetic sensors are arranged in such a manner that their positions are open to each other in an angle of 90 degrees from the rotation shaft, and said housing is structured in such a manner that a cut-out portion is formed on said housing for drawing out the band-formed wiring part therethrough, the sensor mounting part is formed along a shape of the cut-out portion, and the flexible printed substrate is engaged with said housing to be fixed therein.

7. A magnetic micro-encoder, comprising:

a magnetic disk mounted on a rotation shaft and polarized in an axial direction;

a first back yoke mounted on said magnetic disk;

two magnetic sensors arranged opposite to a surface of said magnetic disk in an axial direction with a gap therebetween, said magnetic sensors being mounted on a sensor mounting part of a flexible printed substrate in such a manner that longitudinal directions of said magnetic sensors are substantially parallel to a band-formed wiring part of the flexible printed substrate;

a second back yoke mounted on a back of said magnetic sensors with the flexible printed substrate intervened therebetween, said second back yoke forming a magnetic circuit with said first back yoke and said magnetic disk; and a housing for accommodating said first back yoke, said magnetic sensors, and said second back yoke, wherein said housing is structured in such a manner that a cut-out portion is formed on said housing for drawing out the band-formed wiring part therethrough, the sensor mounting part is formed along a shape of the cut-out portion, and the flexible printed substrate is engaged with said housing to be fixed therein, and said housing comprises a fixing structure such that a stepped portion is formed on an inner surface of said housing, said second back yoke is engaged with said housing with the flexible printed substrate intervened therebetween, and the flexible printed substrate is sandwiched between the stepped portion and said second back yoke to be fixedly arranged therebetween in a mechanical manner.

8. A magnetic micro-encoder, comprising:

a magnetic disk mounted on a rotation shaft and polarized in an axial direction;

a first back yoke mounted on said magnetic disk;

two magnetic sensors arranged opposite to a surface of said magnetic disk in an axial direction with a gap therebetween, said magnetic sensors being mounted on a sensor mounting part of a flexible printed substrate in such a manner that longitudinal directions of said magnetic sensors are substantially parallel to a band-formed wiring part of the flexible printed substrate;

a second back yoke mounted on a back of said magnetic sensors with the flexible printed substrate intervened therebetween, said second back yoke forming a magnetic circuit with said first back yoke and said magnetic disk; and a housing for accommodating said first back yoke, said magnetic sensors, and said second back yoke, wherein a number of magnetic poles of said magnetic disk is defined as 2 (1+4n) (where "n" is an integer of 0(zero) or more), said two magnetic sensors are arranged in such a manner that their positions are open to each other in an angle of 90 degrees from the rotation shaft, said housing is structured in such a manner that a cut-out portion is formed on said housing for drawing out the band-formed wiring part therethrough, the sensor mounting part is formed along a shape of the cut-out portion, and the flexible printed substrate is engaged with said housing to be fixed therein, and said housing comprises a fixing structure such that a stepped portion is formed on an inner surface of said housing, said second back yoke is engaged with said housing with the flexible printed substrate intervened therebetween, and the flexible printed substrate is sandwiched between the stepped portion and said second back yoke to be fixedly arranged therebetween in a mechanical manner.

9. A magnetic micro-encoder, comprising:

a magnetic disk mounted on a rotation shaft and polarized in an axial direction;

a first back yoke mounted on said magnetic disk;

two magnetic sensors arranged opposite to a surface of said magnetic disk in an axial direction with a gap therebetween, said magnetic sensors being mounted on a sensor mounting part of a flexible printed substrate in such a manner that longitudinal directions of said magnetic sensors are substantially parallel to a band-formed wiring part of the flexible printed substrate;

a second back yoke mounted on a back of said magnetic sensors with the flexible printed substrate intervened therebetween, said second back yoke forming a magnetic circuit with said first back yoke and said magnetic disk; and a housing for accommodating said first back yoke, said magnetic sensors, and said second back yoke, wherein a number of magnetic poles of said magnetic disk is defined as 2 (3+4n) (where "n" is an integer of 0(zero) or more), said two magnetic sensors are arranged in such a manner that their positions are open to each other in an angle of 90 degrees from the rotation shaft, said housing is structured in such a manner that a cut-out portion is formed on said housing for drawing out the band-formed wiring part therethrough, the sensor mounting part is formed along a shape of the cut-out portion, and the flexible printed substrate is engaged with said housing to be fixed therein, and said housing comprises a fixing structure such that a stepped portion is formed on an inner surface of said housing, said second back yoke is engaged with said housing with the flexible printed substrate intervened therebetween, and the flexible printed substrate is sandwiched between the stepped portion and said second back yoke to be fixedly arranged therebetween in a mechanical manner.

10. The magnetic micro-encoder according to any one of claims 1 to 9, wherein said second back yoke doubles as an end cap to cover an opening of said housing.

11. The magnetic micro-encoder according to any one of claims 1 to 9, wherein said housing is formed in a substantially cylindrical shape, and said housing is formed in an external diameter of 5 Φ mm or less.

12. The magnetic micro-encoder according to any one of claims 1 to 9, wherein said second back yoke doubles as an end cap to cover an opening of said housing, said housing is formed in a substantially cylindrical shape, and said housing is formed in an external diameter of 5 Φ mm or less.

13. A micromotor, comprising the magnetic micro-encoder according to any one of claims 1 to 9.

14. A micromotor, comprising the magnetic micro-encoder according to any one of claims 1 to 9, wherein said second back yoke doubles as an end cap to cover an opening of said housing.

15. A micromotor, comprising the magnetic micro-encoder according to any one of claims 1 to 9, wherein said housing is formed in a substantially cylindrical shape, and said housing is formed in an external diameter of 5 Φ mm or less.

16. A micromotor, comprising the magnetic micro-encoder according to any one of claims 1 to 9, wherein said second back yoke doubles as an end cap to cover an opening of said housing, said housing is formed in a substantially cylindrical shape, and said housing is formed in an external diameter of 5 Φ mm or less.

17. A micromotor, comprising:

the magnetic micro-encoder according to any one of claims 1 to 9; and a speed reducer.

18. A micromotor, comprising:

the magnetic micro-encoder according to any one of claims 1 to 9, wherein said second back yoke doubles as an end cap to cover an opening of said housing, and a speed reducer.

19. A micromotor, comprising:

the magnetic micro-encoder according to any one of claims 1 to 9, wherein said housing is formed in a substantially cylindrical shape, and said housing is formed in an external diameter of 5 Φ mm or less, and a speed reducer.

20. A micromotor, comprising:

the magnetic micro-encoder according to any one of claims 1 to 9, wherein said second mack yoke doubles an end cap to cover an opening of said housing, said housing is formed in a cylindrical shape, and said housing is formed in an external diameter of 5 Φ mm or less, and a speed reducer.

* * * * *